US009262271B2

(12) United States Patent
Southern (10) Patent No.: US 9,262,271 B2
(45) Date of Patent: Feb. 16, 2016

(54) METHOD OF IMPROVING FAULT TOLERANCE IN A COMPUTING SYSTEM ARRANGED TO FIND A COMPUTATIONAL SOLUTION (71) Applicant: FUJITSU LIMITED, Kawasaki-shi, Kanagawa (JP)

(72) Inventor: James Alastair Southern, Reading (GB)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 14/264,559

(22) Filed: Apr. 29, 2014

(65) Prior Publication Data

US 2014/0344618 A1    Nov. 20, 2014

(30) Foreign Application Priority Data

May 17, 2013  (EP) ..................................... 13168261

(51) Int. Cl.
G06F 11/00  (2006.01)
G06F 11/14  (2006.01)

(52) U.S. Cl.
CPC ........ G06F 11/1412 (2013.01); G06F 11/1479 (2013.01)

(58) Field of Classification Search
CPC .................................................. G06F 11/1412
See application file for complete search history.

(56) References Cited

U.S. PATENT DOCUMENTS

| 7,565,657 | B1 | | 7/2009 | Leung et al. |
| 8,843,423 | B2 | * | 9/2014 | Chu ..................... G06N 99/005 706/12 |
| 9,099,160 | B2 | * | 8/2015 | Mallary ................. B82Y 10/00 |
| 2011/0252268 | A1 | * | 10/2011 | Avizienis ............ G06F 11/0793 714/2 |
| 2011/0302450 | A1 | | 12/2011 | Hickey et al. |
| 2013/0128372 | A1 | * | 5/2013 | Mallary ................. B82Y 10/00 360/31 |
| 2013/0173974 | A1 | * | 7/2013 | Sul ....................... G11C 29/003 714/719 |
| 2013/0297976 | A1 | * | 11/2013 | McMillen ............. G06F 11/079 714/43 |
| 2015/0242747 | A1 | * | 8/2015 | Packes ................... G06Q 50/16 706/17 |

FOREIGN PATENT DOCUMENTS

CN           101075206      11/2007
WO     WO 2006/055026 A1    5/2006
WO     WO 2008/129359 A2   10/2008

OTHER PUBLICATIONS

H. Ltaief et al., "Fault Tolerant Algorithms for Heat Transfer Problems (Technical Report No. UH-CS-07-03)", Department of Computer Science at the University of Houston, Apr. 2007, pp. 1-16 and cover sheet.

C. Wang et al., "Proactive Process-Level Live Migration in HPC Environments", *Proceedings of the 2008 ACM/IEEE conference on Supercomputing*, Nov. 2008, 12 pages.

(Continued)

*Primary Examiner* — Christopher McCarthy
(74) *Attorney, Agent, or Firm* — Staas & Halsey LLP (57) ABSTRACT A method of improving fault tolerance in a computing system arranged to find a computational solution, the method comprising: computing at least two versions of the solution by using a hierarchy of at least two different solvers in parallel; and if there is a fault during execution of a solver resulting in a missing value, substituting a value from a solver that is lower in the hierarchy to replace the missing value.

15 Claims, 8 Drawing Sheets

(56) References Cited

OTHER PUBLICATIONS

D. Fiala et al., "Detection and Correction of Silent Data Corruption for Large-Scale High-Performance Computing", *Proceedings of the International Conference on High Performance Computing, Networking, Storage and Analysis*, Nov. 2012, 12 pages.

J. W. Larson et al., "Fault-Tolerant Grid-Based Solvers: Combining Concepts from Sparse Grids and MapReduce", *Procedia Computer Science*, vol. 18, 2013, pp. 130-139.

Extended European Search Report mailed Feb. 19, 2014 in corresponding European Patent Application No. 13168261.9.

* cited by examiner

METHOD OF IMPROVING FAULT TOLERANCE IN A COMPUTING SYSTEM ARRANGED TO FIND A COMPUTATIONAL SOLUTION

CROSS-REFERENCE TO RELATED APPLICATIONS

This application claims the benefit of European Application No. 13168261.9, filed May 17, 2013, the disclosure of which is incorporated herein by reference.

BACKGROUND

1. Field

The present invention relates to fault resilience in computing systems. Fault-resilient computer programs are required in a wide range of application areas, for instance from simple computations to image rendering and large-scale, complex simulations, including on-the-fly and offline processing. As one important example, mission-critical jobs (e.g. operational weather forecasting) or systems (e.g. the internet) must be resilient to failure. This invention addresses the whole gamut of these application areas, and is focused particularly on distributed, parallel computer programs running on very large high-performance computing systems with data distributed over a number of CPUs.

2. Description of the Related Art

Computationally intense applications are usually carried out on high performance computer systems. Such high performance computer (HPC) systems often provide distributed environments in which there is a plurality of processing units or cores on which processing threads of an executable can run autonomously in parallel.

Many different hardware configurations and programming models are applicable to high performance computing. A popular approach to high-performance computing currently is the cluster system, in which a plurality of nodes each having one or more multicore processors (or "chips") are interconnected by a high-speed network. Each node is assumed to have its own area of memory, which is accessible to all cores within that node. The cluster system can be programmed by a human programmer who writes source code, making use of existing code libraries to carry out generic functions. The source code is then compiled to lower-level executable code, for example code at the ISA (Instruction Set Architecture) level capable of being executed by processor types having a specific instruction set, or to assembly language dedicated to a specific processor. There is often a final stage of assembling or (in the case of a virtual machine, interpreting) the assembly code into executable machine code. The executable form of an application (sometimes simply referred to as an "executable") is run under supervision of an operating system (OS).

Applications for computer systems having multiple cores may be written in a conventional computer language (such as C/C++ or Fortran), augmented by libraries for allowing the programmer to take advantage of the parallel processing abilities of the multiple cores. In this regard, it is usual to refer to "processes" being run on the cores. A (multi-threaded) process may run across several cores within a multi-core CPU. One such library is the Message Passing Interface, MPI, which uses a distributed-memory model (each process being assumed to have its own area of memory), and facilitates communication among the processes. MPI allows groups of processes to be defined and distinguished, and includes routines for so-called "barrier synchronization", which is an important feature for allowing multiple processes or processing elements to work together. Barrier synchronization is a technique of holding up all the processes in a synchronization group executing a program until every process has reached the same point in the program. This is achieved by an MPI function call which has to be called by all members of the group before the execution can proceed further.

Alternatively, in shared-memory parallel programming, all processes or cores can access the same memory or area of memory. In a shared-memory model there is no need to explicitly specify the communication of data between processes (as any changes made by one process are transparent to all others). However, it may be necessary to control access to the shared memory to ensure that only one process at a time modifies the data. In a "threaded" shared memory programming model, such as OpenMP, a single process can have multiple, concurrent execution paths (possibly one thread of execution per physical core available to the process).

The latest generation of supercomputers contain hundreds of thousands or even millions of cores. The three systems on the November 2012 TOP500 list with sustained performance over 10 Pflop/s contain 560,640 (Titan), 1,572864 (Sequoia) and 705,024 (K computer) cores. In moving from petascale to exascale, the major performance gains will result from an increase in the total number of cores in the system (flops per core is not expected to increase) to 100 million or more. As the number of nodes in the system increases (and especially if low-cost, low-energy nodes are used to maintain an acceptable power envelope) the mean-time-to-component-failure of the system will decrease—eventually to a time shorter than the average simulation run on the system. Hence, it will be necessary for exascale software to be resilient to component failure.

There are several methods that may be used to achieve fault-resilient exascale application software. These include:
  Improvements to MPI to automatically handle component failure in a manner that is invisible to the application.
  Development of new algorithms that can be implemented within software to allow it to compensate if one (or more) MPI task suffers a fault during execution.
  Improved methods to frequently (and rapidly) checkpoint massively parallel simulations in order that they can be restarted from a point immediately prior to the fault.
  Replication of work, so that tasks are identically executed by more than one processing element—if one processing element suffers a fault then the result from the other is generally still available.
  The use of task pools with reassignment, where a master process coordinates the execution of independent tasks and can reassign a task where the processor originally assigned the work fails.

There are problems with each of these prior art methods. An automatic MPI response to a fault may not be optimal for a particular application, so a developer may prefer to retain control of how faults are dealt with. Checkpointing (especially on very large systems) is time consuming and—if a fault occurs just before a checkpoint is due (or during a checkpoint)—may result in a large amount of computation having to be repeated. Replication of work is also expensive—and if the entire program function must be duplicated for fault resilience then, in effect, the available computing power is halved. Task pools with reassignment avoid the need to duplicate so much work, but for some applications (especially the very large applications expected to run on exascale systems) it may not be possible to break the work up into sufficiently fine-grained independent tasks.

The inventor is aware of a related-art method for algorithm-based fault-tolerance based on the combination method. In this method, the combination method is used within a solver to overcome faults: solutions are computed on several coarse grids, and combined to produce a more accurate solution. A component failure in any one grid reduces the accuracy of the combined solution, but only within a known tolerance. However, there are drawbacks to this method also. In particular:

It assumes that there is an underlying grid in the simulation. This is not necessarily the case for a general application.

Failure of one node leads to other nodes also being unable to contribute to the solution (and nodes computing the solution on the coarse grid which the faulty node was working on are unused). If there are a large number of coarse grids this may not be a significant problem, but in general an application will want to exploit all resources available to it.

It is desirable to enable a simulation running over a plurality of processors to run to completion (and retain sufficient accuracy) even when one (or more) of the processors suffers a fault. This would be applicable particularly in exascale computing, in which applications such as simulations will be required to be run using many millions of processors and the likelihood of a small number of failures while the simulation is running is high.

SUMMARY

Additional aspects and/or advantages will be set forth in part in the description which follows and, in part, will be apparent from the description, or may be learned by practice of the invention.

This invention proposes a new methodology that can be implemented to allow software to cope with a fault.

Embodiments of one aspect of the invention provide a method of improving fault tolerance in a computing system arranged to find a computational solution, the method comprising computing at least two versions of the solution by using a hierarchy of different solvers in parallel; and if there is a fault during execution of a solver that is higher in the hierarchy resulting in a missing value, substituting a value from a solver that is lower in the hierarchy to replace the missing value.

The inventor proposes herein a methodology that can be implemented within solvers within computing software such as HPC software to allow an application to run to completion even if one (or more) nodes, cores, CPUs, FGPA, GPU or other processing units of the system fail. Note that the term "solver" here does not necessarily refer to the solution of a mathematical equation—it could equally apply to any computation (e.g. data processing or image rendering).

Algorithm-based fault-tolerance (ABFT) is a current area of research and some of this research is for applications that use a grid (e.g. solution of partial differential equations, PDEs via finite element, finite volume and finite difference methods) Such ABFT developments have the potential to solve multiple problems on coarser grids and combine them to produce a more accurate result—allowing grids that experience a fault to be discarded in the final solution. Such methods cannot, however, be immediately applied to applications that are not based on a grid (e.g. particle-based methods used in computational fluid dynamics (CFD) or computational chemistry). The present invention is a fault-tolerant methodology for general use with HPC and other applications—including those that do not use a grid.

The inventor has come to the realization that the main technical issue relating to fault-tolerant application execution relates to loss of data when a node or other processing unit fails. This leads to the inability to communicate this data.

Re-starting computation would be relatively easy if the data immediately before failure were available. In many distributed applications, each process performs inter-related tasks within an algorithm—and frequent communication of data from other processes is a critical part of the algorithm. If a process fails then how can other processes deal with the missing information that they expected to receive from that process? A second technical issue relates to completion of the computation that the application is expecting to be carried out on the failed process. Even if there is no further communication required from this process, its output forms a part of the overall solution and this must be recreated in order for the application to complete successfully.

Fault-tolerance is currently not a part of the MPI specification (http://www.mpi-forum.org/docs/). However, as mentioned above, various fault-tolerant MPI implementations do exist (e.g. fault-tolerance is part of OpenMPI: http://www.open-mpi.org). In general, these are based on automated checkpoint-restart technology and message-logging and result in a slowdown of application execution. Once a fault is identified it is necessary to repeat all the computation on the failed process and all communication to and from it since the last checkpoint. While this is happening the remaining processes must wait (as they cannot proceed until they have received the messages required from the failed process).

Hence, algorithm-based fault-tolerance according to invention embodiments, in which an application may be able to recognize a fault and recover from it rapidly, is valuable for augmenting the fault-tolerant MPI implementations (fault-tolerant MPI may still be used in order to notify the application of a fault and to ensure an orderly shut-down of the faulty node).

The invention embodiments use a hierarchy of different solvers. That is, each solver does not function in the same way, but uses a different method from the other solvers, so there is no duplication of solvers. A solver that is higher in the hierarchy gives a better result, and is used for the solution, whereas a solver that is lower in the hierarchy is essentially for fault resilience purposes. For example, there may be two solvers in the hierarchy, one of which gives a better result by use of a preferred methodology.

In preferred embodiments, two different solvers are a less accurate solver and a more accurate solver and if there is a fault during execution of the more accurate solver resulting in a missing value, a value from the less accurate solver is substituted to replace the missing value.

If the solver that is lower in the hierarchy is less accurate, the resources needed for fault resilience may be considerably lower than required for an equivalent redundant implementation with two identical solvers. The solution eventually used by the application is, naturally, that of the more accurate solver, which is higher in the hierarchy.

Substitution of a value from the less accurate solver is preferably from the adjacent lower solver in the hierarchy, but in some embodiments with more than two solvers, if there is also a fault in the adjacent lower solver, a value from the solver below that solver may be provided.

Taking embodiments with two solvers as an illustration, some of the available processes can compute an "accurate" (more accurate) version of the solution (exactly as in a standard, non-fault-tolerant execution). However, other processes can instead compute a "fast" (less accurate) version of the solution. Computation of the fast solution should require less time than that of the accurate solution. In preferred examples, computation of the fast solution may require at least one order of magnitude less time than that of the accurate solution.

Time savings could be achieved by one or more of the following:
- Use of an explicit method for the fast solution (versus implicit for the accurate solution).
- Use of a larger time step in the fast solution (versus smaller for the accurate solution).
- Use of single precision arithmetic in the fast solution (versus double precision for the accurate solution).
- In grid-based solvers, use of a coarser grid in the fast solution (versus a finer grid for the accurate solution).
- Only process a subset of the data in the fast solution (versus all of the data in the accurate solution).
- Use of a looser convergence criterion in the fast solution
- Use of any other less computationally intensive approximation in the fast solution (while retaining the required accuracy in the accurate solution).

Thus in many examples, the less accurate solver uses a computationally less intensive approximation than the more accurate solver to compute the solution.

If a process involved in computing the accurate solution suffers a fault then the corresponding current data from the fast solution can be rapidly accessed in its place. Preferably, a controlling application (which may be the application running the hierarchical solvers) manages the substitution following failure, to provide a current value from the solver that is lower in the hierarchy to substitute into the computation in the solver from which the value is missing.

Substitution may be effected in any suitable way, for instance by direct replacement with a corresponding actual value from the less accurate solution or by calculation of a replacement value interpolated from the actual values of the less accurate solution.

In one example, the less accurate solver can have the same discretization of the problem, but use a faster (and less accurate) time-stepping method. So, there is a one-to-one correspondence between the two solutions—and if component na of the accurate solution is lost then it can be directly replaced by component nf of the fast solution. Hence component nf is the value which is substituted for missing value na In general, this may not be the case (e.g. there may be a finer discretization for the accurate solution and a coarser discretization for the fast solution). In this situation, the controlling application can maintain a mapping that defines how the accurate solution can be approximated from the fast solution. For example, if the accurate solution is to be computed by interpolation from more than one component of the fast solution then the application can have a pre-calculated map identifying which components of the fast solution (and with what weight) should be used in interpolation of each component of the accurate solution, to give a current value for substitution.

The computing system according to invention embodiments may comprise multiple processing units, such as CPUs. The computing system may be a high performance computing HPC system. In one embodiment, each processing unit may be a core of a multi-core CPU. In another embodiment each processing unit may be a node in a computing system. In further embodiments the processing units may be any combination of CPU, FGPA, GPUs or other processing units.

For load-balancing or other purposes, the less accurate solver can execute on a different number of processing units than the more accurate solver, such as fewer processing units. This arrangement has the additional advantage that the less accurate solution may be less vulnerable to failure because it requires less communication between processing units.

As mentioned above, the less accurate solver is likely to require fewer computing resources, and thus execute more quickly than a solver higher in the hierarchy when using the same number of processing units. The execution speed of the two solvers can be made more consistent by dividing the more accurate solver execution into more parallel processes. Thus each solver may execute in a number of processes hosted on the computing system, the less accurate solver being split into fewer processes. To reduce redundancy, the difference between the solvers can be such that less accurate solver processes account for less than 20%, more preferably less than 10%, most preferably less than 1% of the total number of processes for both solvers.

Faults in processes computing the fast solution are less likely (as they represent only a small percentage of the total number of processes), but these can be recovered from in several ways:
- Reconstruction from the accurate solution.
- Duplication of computation for the fast solution.
- A further layer of processes in the hierarchy that compute a "very fast" solution, much faster (but less accurately) than the fast solution is computed.

Thus although the previous examples refer to a hierarchy of two solvers, any number of solvers may be provided within the hierarchy, for example, 3, 4 or 5 solvers may be used. In one example, three or more different versions of the solution are computed using a hierarchy of three or more solvers of different accuracy levels, the method comprising: computing three or more versions of the solution by using all the solvers in parallel; and during execution of the solvers, substituting a value from a less accurate solver to replace a missing value in the more accurate solver one level in the hierarchy above the less accurate solver in the hierarchy.

Alternatively or additionally (perhaps for the fastest solver which is the lowest in the hierarchy) during execution of the solvers, the method of invention embodiments may include substituting a value from a solver that is higher in the hierarchy or from a duplicate solver for a solver that is lower in the hierarchy to replace a missing value in the solver that is lower in the hierarchy. Hence a value from the more accurate of two solvers or a value from a duplicate solver for the less accurate solver may replace a missing value in the less accurate solver resulting from a fault in the execution of that solver.

Advantageously, at least the more accurate solver methodology includes periodic synchronization of values across its computation, and the less accurate solver is periodically refreshed with the most recently synchronized values from the more accurate solver. For example in iterative calculations, this refreshing procedure may take place in the same iteration (loop) as the fault, or once every X loops, where X is one or more. The same controlling application and mapping methodologies as mentioned above for substituting values can be used for refreshing values in the less accurate solver.

Incidentally, for such iterative solvers with periodic synchronization between the fast and the accurate solvers, it is still advantageous to replace any missing value in the less accurate (fast) solvers, even though all the values will be refreshed at the end of the loop. The fast solver will need these values to continue to compute its approximation and these will be required in the event of any failures in the accurate solver before the refresh.

The solvers in the hierarchy can use any suitable numerical methods. However, since the solver(s) lower in the hierarchy are not used for the final solution, some usual constraints applied to selecting a solver need not apply. For example, the solver(s) lower in the hierarchy may use (a) numerically unstable method(s).

The missing value can be the result of any fault in the computing system. In some embodiments it is due to miscommunication between processing units of the computing system or due to a failed computation at a processing unit of the computing system.

The method may further comprise detection of a fault, for example by receipt of a notification from a message passing interface MPI or by detection within the solver itself (in this case most probably by non-receipt of an expected message within some period of time).

According to an embodiment of a system aspect, there is provided a computing system comprising a plurality of processing units linked by an interconnect and configured to find at least two versions of a computational solution in parallel using a hierarchy of at least two different solvers: a smaller subset of the processing units being arranged to compute one version of the solution using a solver that is lower in the hierarchy and a larger subset of the processing units being arranged to compute the other version of the solution using a solver that is higher in the hierarchy; wherein if there is a fault during execution of the solver that is higher in the hierarchy resulting in a missing value, the interconnect is arranged to, during execution of the solvers, substitute a value from the solver that is lower in the hierarchy to replace the missing value.

In a more specific embodiment of a system aspect there is provided a high performance computing system comprising a plurality of nodes linked by an interconnect and configured to find at least two versions of a computational solution in parallel: a smaller subset of the nodes being arranged to compute one version of the solution using a less accurate solver and a larger subset of the nodes being arranged to compute the other version of the solution using a more accurate solver; wherein if there is a fault during execution of the more accurate solver resulting in a missing value, the interconnect is arranged to, during execution of the solvers, substitute a value from the less accurate solver to replace the missing value in the more accurate solver.

An embodiment of a computer program aspect of the present invention provides a computer program, which when executed on a computing system, carries out a method comprising: computing at least two versions of a computational solution using a hierarchy of different solvers in parallel; if there is a fault during execution of a solver resulting in a missing value, substituting a value from a solver that is lower in the hierarchy to replace the missing value; and using the solution of the solver that is higher in the hierarchy as the computational solution.

The computer program may be a controlling application which includes the solvers or it may call separate programs or subroutines which provide the solvers.

According to a further general program aspect there is provided a program which when loaded onto a computing apparatus such as a distributed computer system configures the computing apparatus to carry out the method steps according to any of the preceding method definitions or any combination thereof.

Features and sub features of any of the different aspects of the invention may be freely combined. For example, preferred embodiments of the computer system may be configured to incorporate functionality corresponding to one or more preferred features of the method.

The invention can be implemented in computer hardware, firmware, software, or in combinations of them. The invention can be implemented as a computer program or computer program product, i.e., a computer program tangibly embodied in an information carrier, e.g., in a machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the invention can be performed by one or more programmable processors executing a computer program to perform functions of the invention by operating on input data and generating output. Each processor may have one or more cores.

Processors suitable for the execution of a computer program include, by way of example, both general and special purpose microprocessors, and any one or more processors of any kind of digital or biological computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Figure 1:
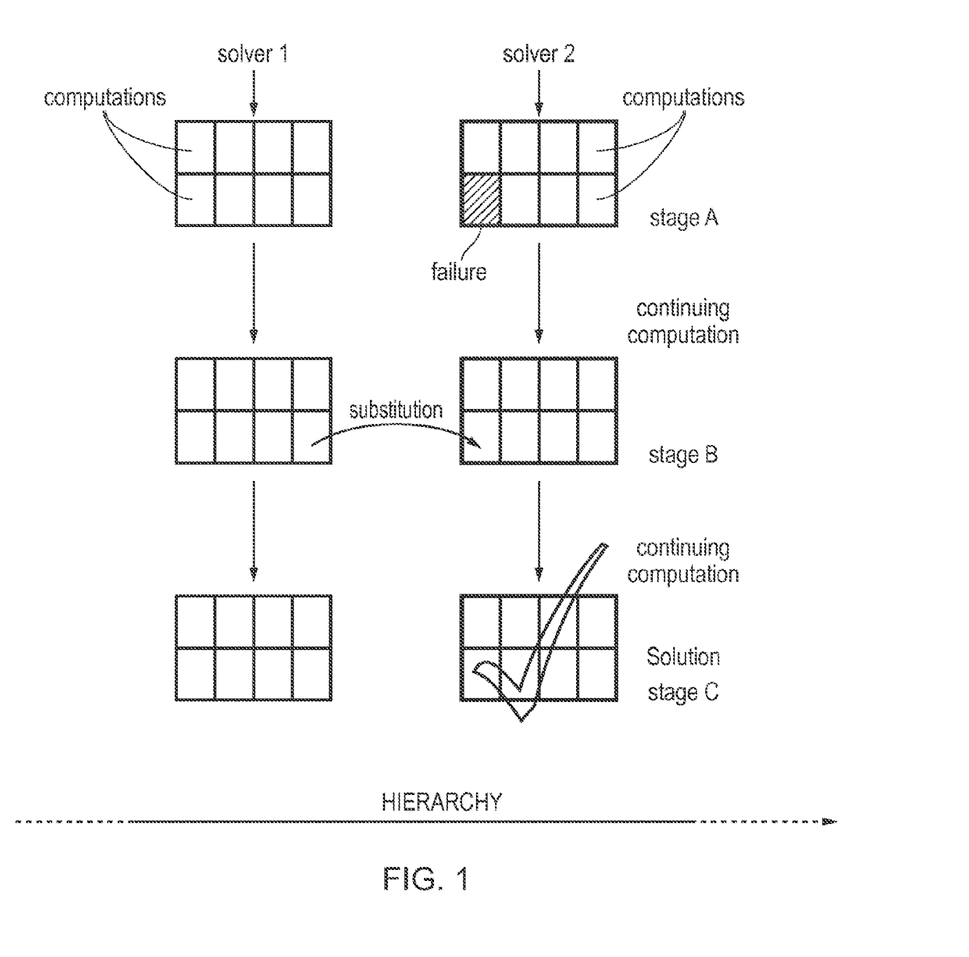
FIG. 1 is a diagrammatic representation of hierarchical solvers in a general embodiment of the invention.

FIG. 1 is an overview diagram of two different solvers according to invention embodiments. Solver 1 is shown to the left and solver 2 to the right. Other solvers may be present within the hierarchy, as illustrated by the dotted lines of the hierarchy arrow to the left and right of Solvers 1 and 2. Solver 2 is higher in the hierarchy, and its results are thus to be used for the computational solution. It is shown in bold, and is assumed to be better in some way, by dint of higher, accuracy, complexity reliability etc.

At stage A, shown at the top of the figure, both solvers are carrying out computations. This is shown by the division of a block into cells, although no particular reference to grid-based solutions is intended, and the skilled reader will understand that many more than the six computations illustrated will usually be provided, and that the two solvers may each include a different number of computations. One computation in solver 2 has failed.

At stage B, which may occur for example at the end of a loop in the methodology, a value from solver 1 is substituted (copied) into the corresponding computation in solver 2. Whilst only one substitution is shown, more may be carried out, consecutively or together. Furthermore, if the two solvers include different numbers of computations and there is thus no directly corresponding value, the substituted value may be interpolated from the values in solver At stage C, the solution is used from solver 2, including the substituted value from solver 1, or including a value derived at least partially from the substituted value.

Figure 2:
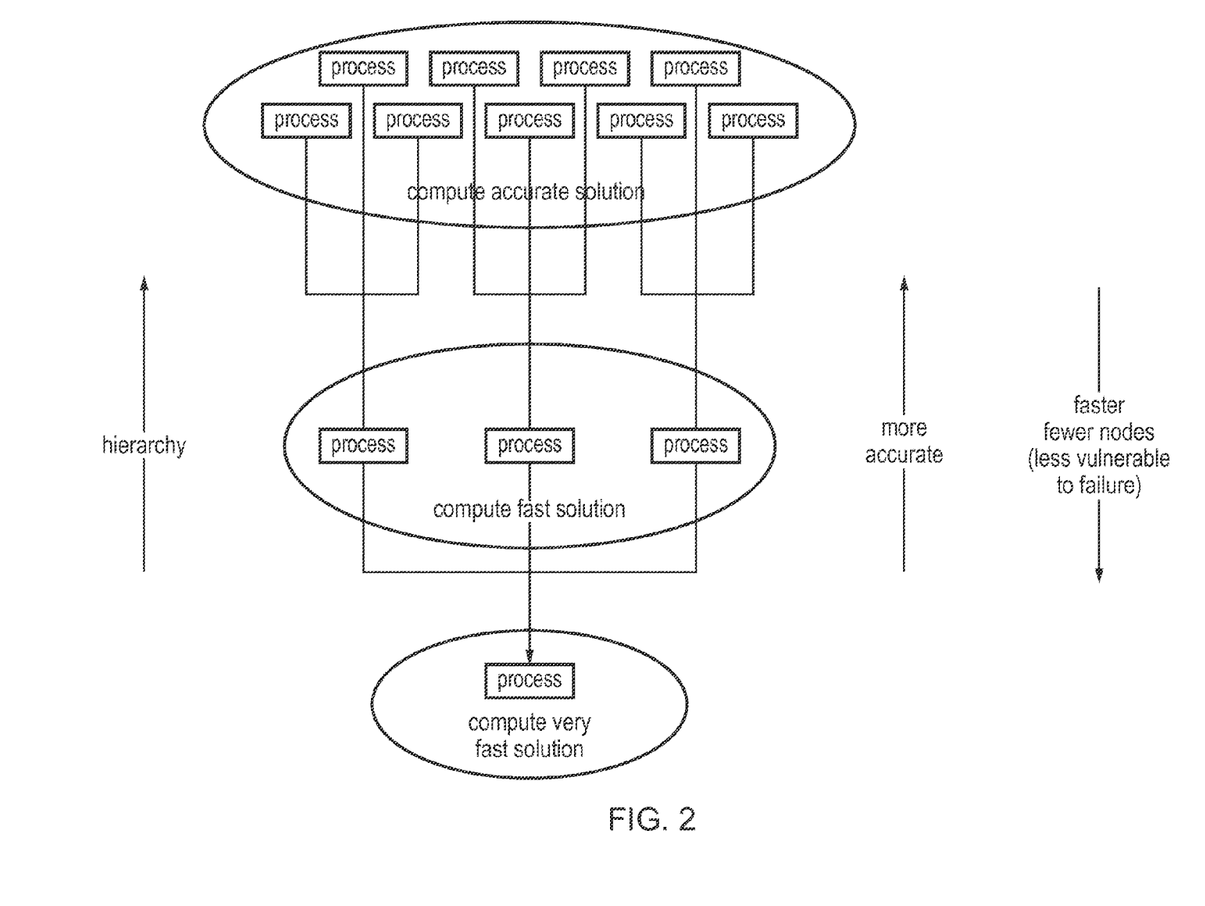
FIG. 2 is an overview of hierarchical structure for fault-tolerance.

FIG. 2 illustrates the hierarchical structure for fault tolerance according to invention embodiments. Three solvers are shown here.

At the highest level (shown at the top of the diagram), most of the available processes compute the solution to the accuracy required by the application. The lower levels (shown below this accurate level) provide successively less accurate (but faster to compute) solutions. Since these are faster to compute they require fewer processes to achieve the same run-time as the highest level. If a higher-level process suffers a fault then the solution from the corresponding lower level process is used instead. Note that this hierarchy could be extended to more than three levels (or reduced to just two levels).

In order to ensure that errors do not build up over time in the fast solution, this is periodically re-initialized from the latest version of the accurate solution (e.g. whenever data is synchronized amongst the processes computing the accurate solution, then this information should also be communicated to those computing the fast solution).

Figure 3A:
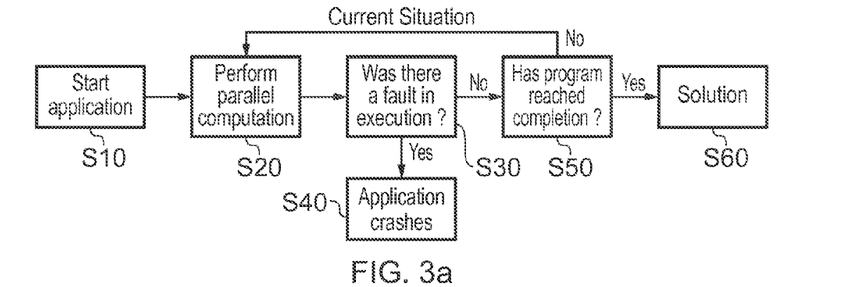
FIG. 3a is a flow chart illustrating the path through execution of a distributed parallel computer program according to the state of the art.
Figure 3B:
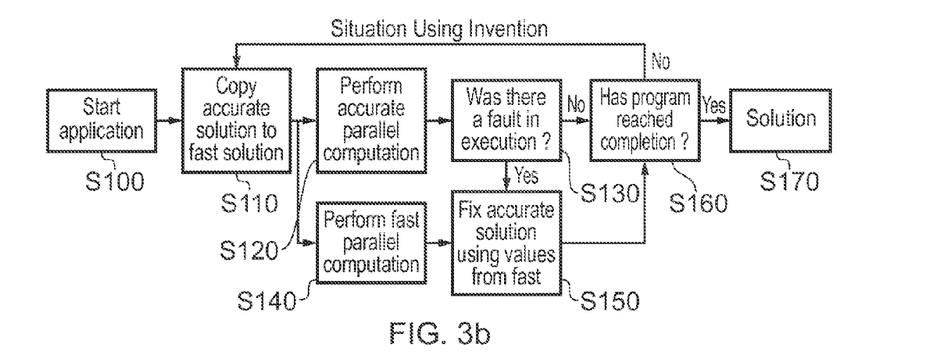
FIG. 3b is a flow chart comparison illustrating the path through execution of a distributed parallel computer program according to invention embodiments.

FIGS. 3a and 3b show two flow charts illustrating the path through execution of a distributed parallel computer program with iterative execution, both in the prior art situation (with no fault-tolerance) and using the method for fault-tolerant execution of invention embodiments. In the prior art situation, the application may crash whereas using the fault-tolerant method the application is guaranteed to complete and return a solution (assuming that there are only a small number of faults compared to the overall number of CPUs). Note that while this flow chart assumes two levels in the hierarchy this could be extended to more levels.

In the prior art flow chart, the applications starts in step S10 and parallel computation is performed in step S20. In step S30 a fault in execution may be detected. If there is a fault the application crashes in step S40. If not, then step S50 allows the iterations in computation to continue until the program is completed and a solution is returned in step S60.

Turning to the invention embodiments, the application starts in step S100. In step S110, the accurate solution is copied to the fast solution unless this is the first loop of iteration. Processing divides into accurate computation (step S120) and fast computation (step S140). In step S130 a fault in accurate execution may be detected, and if so, the accurate solution is fixed using values from the fast solution in step S150. In step S160 there is a check for completion and loop back to the copying step and computation if not. The solution is returned if the program has reached completion in step S170.

Validation

In order to validate the method a simple MATLAB prototype was implemented to solve the diffusion equation in the presence of (simulated) faults. The diffusion equation (in 3-d) can be written as:

$$\frac{\partial u}{\partial t} = \kappa \left( \frac{\partial^2 u}{\partial x^2} + \frac{\partial^2 u}{\partial y^2} + \frac{\partial^2 u}{\partial z^2} \right)$$

where u(x, y, z, t) is temperature, (x, y, z) is space, t is time and is the diffusion coefficient. If this equation is to be solved on the domain [0, 1]×[0, 1]×[0, 1] with boundary conditions u=0 on the edges of the domain then there exist Fourier solutions of the form $$u(x, t) = Be^{-\kappa n^2 \pi^2 t} \sin(n\pi x)\sin(n\pi y)\sin(n\pi z)$$

where B is a constant and n is a positive integer. Exact solutions constructed from sums of these Fourier solutions can be used to evaluate the accuracy of numerically computed solutions. Solutions in fewer dimensions can be computed by setting the spatial variables for the unwanted dimensions to zero (e.g. z=0 for a 2-d solution and both y=0 and z=0 for a 1-d solution).

The prototype fault-tolerant solver solves the heat equation using the Crank-Nicolson method as the "accurate" solution method and the forward Euler method as the "fast" solution method. Note that the Crank-Nicolson method is implicit (but second-order accurate), whereas the forward Euler method is explicit (but first-order accurate). Implicit methods generally require significantly more compute time than explicit.

Each finite element grid point is considered analogous to a node in a distributed computer system. So, the value of the solution at a grid point is taken to be representative of the data that is stored in memory owned by a node in a larger simulation. The assumption is that when a fault is suffered the application loses the ability to communicate with that node (at least temporarily) and the data is lost.

Faults are randomly generated during the course of the simulation. At each time step a vector of uniformly distributed random numbers (one random number per spatial grid point) is generated. If one or more of the random numbers are less than a given threshold value p (the probability of a failure at any given node in a single time step) then the grid points corresponding to the positions of those numbers in the vector are considered to have suffered a fault. In the event of a fault, the value of u computed from the fast (explicit Euler) solve for that time step is used in place of the value of u computed from the accurate (Crank-Nicolson) solve. Note that this value is used during the implicit solve in the accurate method in order to simulate the failure of messages to be sent from the faulty node.

Figure 4A:
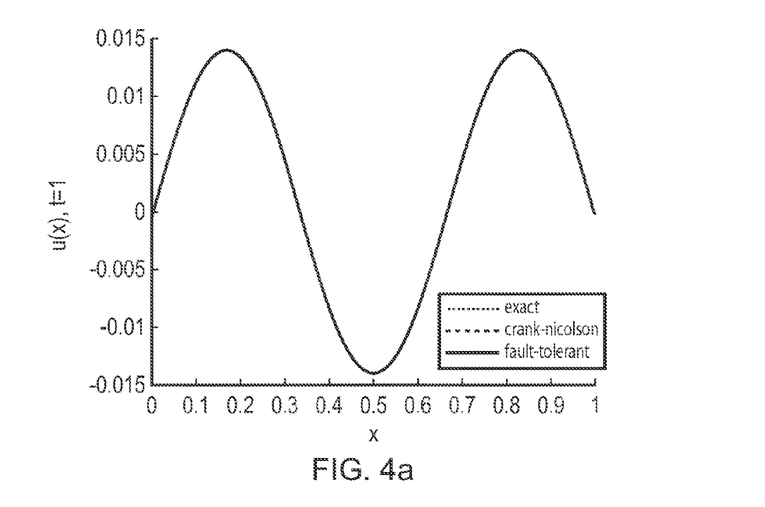
FIG. 4a is a plot showing the solution when solving the 1-d diffusion equation.
Figure 4B:
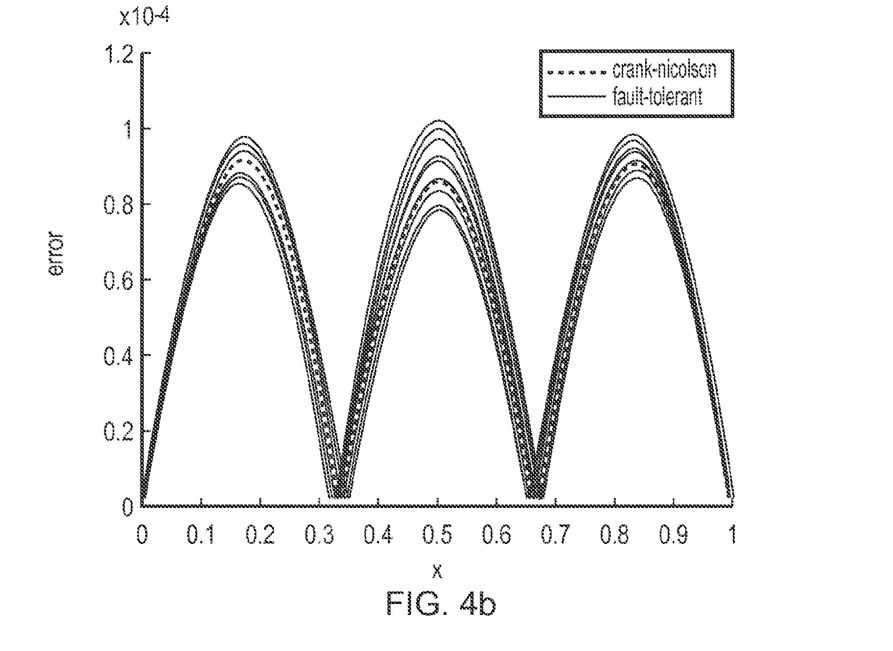
FIG. 4b is a plot showing absolute errors when solving the 1-d diffusion equation.

FIG. 4a is a plot showing the solution and FIG. 4b is a plot showing absolute errors when solving the 1-d diffusion equation (with=0.1) until t=1 (with a time step of $5 \times 10-4$) on the interval [0, 1] (with a spatial step size of 0.01) and with an initial condition $u(x,0)=100 \sin(3x)$ using the Crank-Nicolson method (dashed lines) and the fault-tolerant method (continuous lines) with $p=10-4$. Ten runs with random faults were performed, with the number of faults in each being 16, 22, 19, 21, 20, 21, 19, 14, 20 and 14. This choice of parameter values corresponds to a CFL number of 0.5—for which the explicit Euler method is numerically stable.

Figure 5:
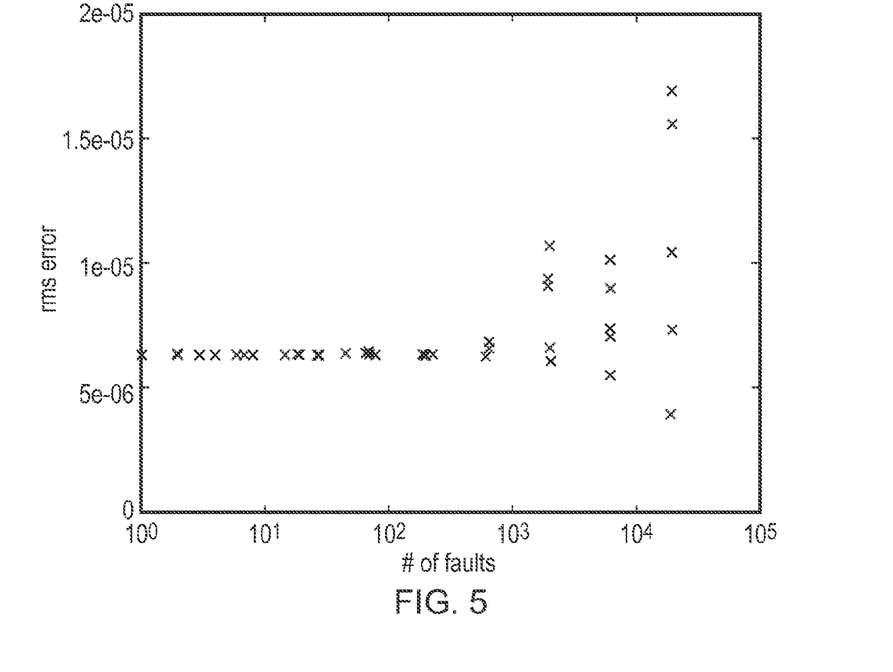
FIG. 5 is a graph of the relationship between the number of faults and the root-mean-square error of the solution for p in the range $10^{-5}$ to 0.1 when running the fault-tolerance method for the same problem as in FIG. 4.

The probability of failure for each node at each time step is $p=10-4$, resulting in between 14 and 22 faults over the runs. Note that in each case the solutions (in FIG. 4a) are indistinguishable from one another, from the Crank-Nicolson solution and from the exact solution (dotted lines). The errors (in FIG. 4b) are essentially equal to those obtained using the Crank-Nicolson method, which is one of the central plots in the spread of plots shown in this figure. The effect of varying the probability of faults is shown in FIG. 5, which plots the relationship between the number of faults and root-mean-square error of the solution. It can be seen that while increasing the number of faults leads to a loss of accuracy, there is only a factor of three difference in the accuracy of the solution with no faults and that when p=0.1.

For the problem used in FIG. 4 and FIG. 5, while the accuracy of the simulation is not significantly reduced, calculating the fast solution with the explicit Euler method is only around 5× faster than calculating the accurate solution with the Crank-Nicolson method. Note, however, that this difference would increase for a larger problem size—e.g. if the space step is decreased to 10-3 then the difference in execution time is over 50×. Similarly, solving a 2- or 3-d problem will lead to a larger system matrix and increase the time difference between the use of implicit and explicit methods.

Note also, that it is possible to use a method that is not numerically stable as the fast solver.

Figure 6A:
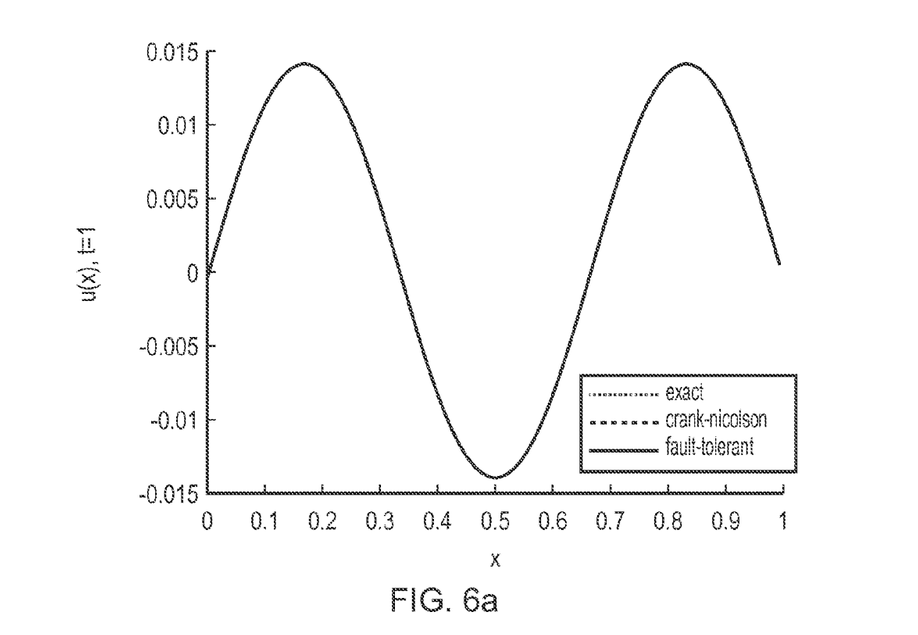
FIG. 6a is a plot showing the solution when solving the 1-d diffusion equation (with K=0.1) until t=1 (with a time step of $10^{-3}$) on the interval [0, 1]
Figure 6B:
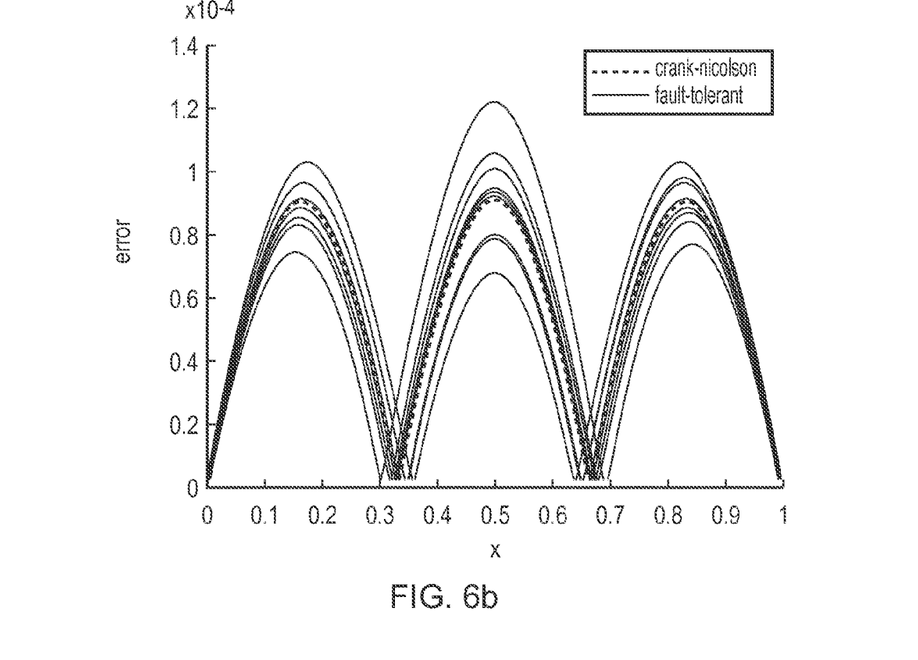
FIG. 6b is a plot showing the absolute errors when solving the 1-d diffusion equation (with K=0.1) until t=1 (with a time step of $10^{-3}$) on the interval [0, 1]

FIGS. 6a and 6b are plots showing solution (FIG. 6a) and absolute errors (FIG. 6b) when solving the 1-d diffusion equation (with=0.1) until t=1 (with a time step of 10-3) on the interval [0, 1] (with a spatial step size of 0.01) and with an initial condition $u(x, 0)=100 \sin(3x)$ using the Crank-Nicolson method (dashed lines) and the fault-tolerant method (continuous lines) with $p=10-4$. Ten runs with random faults were performed, with the number of faults in each being 6, 8, 8, 5, 12, 12, 8, 8, 10 and 8. This choice of parameter values corresponds to a CFL number of 1.0—for which the explicit Euler method is numerically unstable.

Figure 7:
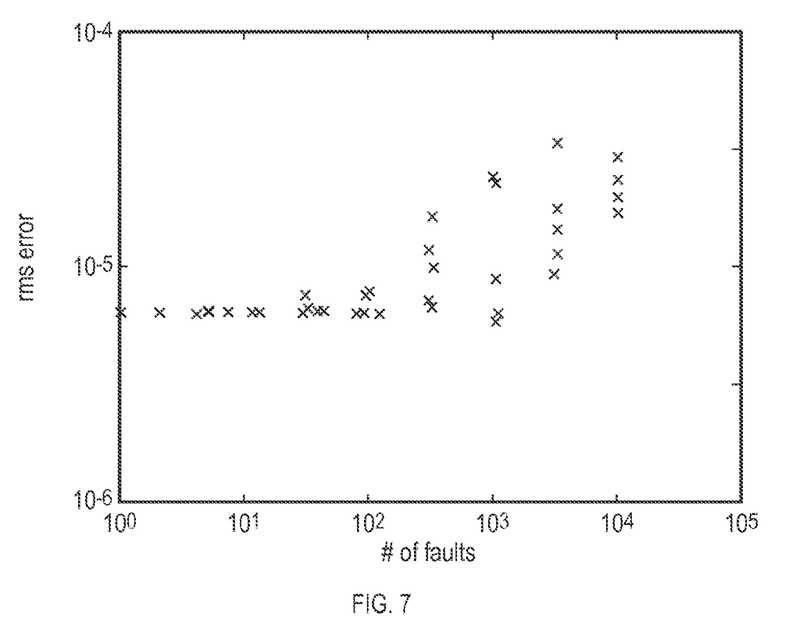
FIG. 7 is a graph of the relationship between the number of faults and the root-mean-square error of the solution for p in the range $10^{-5}$ to 0.1 when running the fault-tolerance method for the same problem as in FIG. 6.

Thus FIGS. 6a and 6b show the results of repeating the simulations used to generate FIGS. 4a and 4b, but doubling the time step to 10-3, so that the CFL number is 1.0 (the explicit Euler method is numerically unstable for CFL numbers greater than 0.5). In these simulations there were between 6 and 12 faults (there are fewer faults for the same value of p as there are half as many time steps). Again, the solutions obtained using the fault-tolerant method are indistinguishable from both the exact solution (shown in dotted lines) and Crank-Nicolson solution (FIG. 6a) and the errors from both methods are of the same order of magnitude (FIG. 6b)—although it is clear from the size of the errors that in general the fault tolerant solutions are less accurate than when the fast solution was numerically stable. This can be seen more clearly in FIG. 7, which shows the root-mean-square errors for numerous fault tolerant runs with p between 10-5 and 0.1. Nevertheless, the errors grow only by around one order of magnitude when moving from no faults to more than 10,000.

Figure 8A:
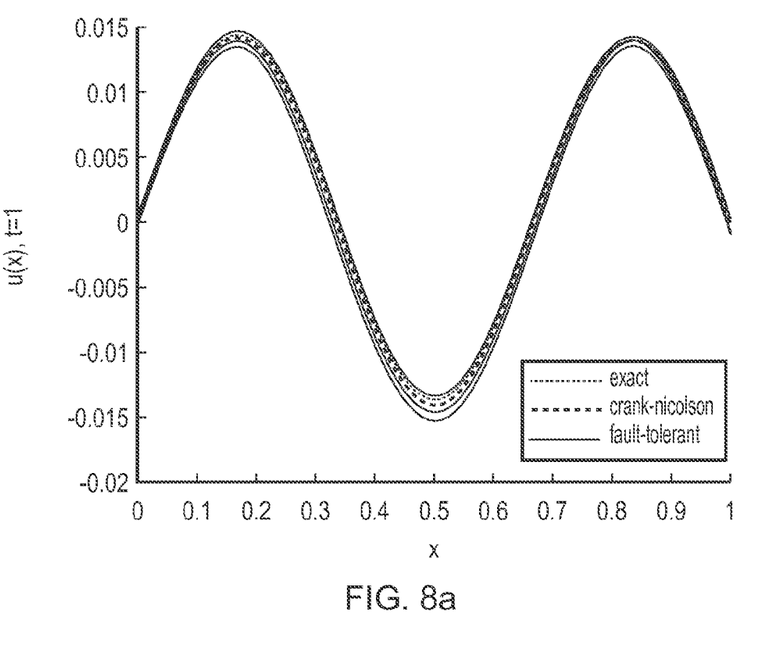
FIG. 8a is a further plot showing the solution when solving the 1-d diffusion equation.
Figure 8B:
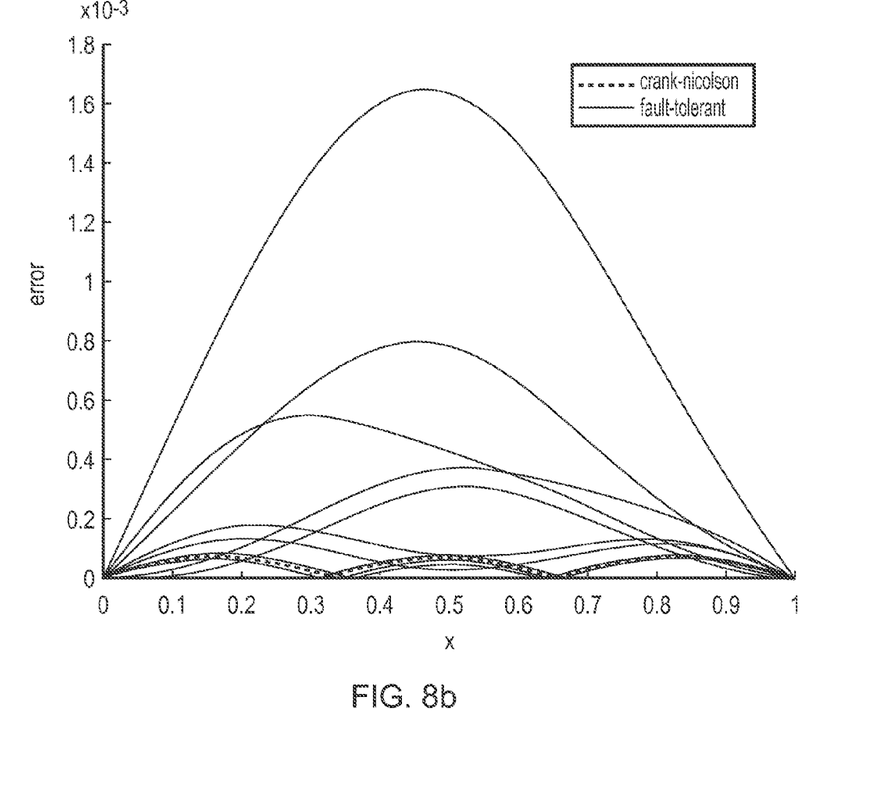
FIG. 8b is a further plot showing the absolute errors when solving the 1-d diffusion equation.

When only a small number of faults are anticipated, it may be possible to use an even less numerically stable fast solver. FIGS. 8a and 8b are plots showing solution and absolute errors when solving the 1-d diffusion equation (with=0.1) until t=1 (with a time step of $5 \times 10-3$) on the interval [0, 1] (with a spatial step size of 0.01) and with an initial condition $u(x, 0)=100 \sin(3x)$ using the Crank-Nicolson method (dashed lines) and the fault-tolerant method (continuous lines) with $p=2 \times 10-4$. Ten runs with random faults were performed, with the number of faults in each being 3, 4, 3, 4, 5, 3, 3, 5, 2 and 10. This choice of parameter values corresponds to a CFL number of 5—for which the explicit Euler method is numerically unstable.

FIGS. 8a and 8b thus show the results of running the simulation with a time step of $5 \times 10-3$, so that the CFL number is 5.0—ten times greater than the maximum value at which the explicit Euler method is stable. In these simulations $p=2 \times 10-4$, leading to between 2 and 10 faults. The solutions from some of the fault-tolerant runs are now clearly distinguishable from the Crank-Nicolson and exact solutions (FIG. 8a) and the errors (FIG. 8b) can be as much as ten times as large as for the Crank-Nicolson method (which is one of the plots with the smallest number of errors). Nevertheless, these errors may be considered acceptable given how far past numerical stability the fast solver has been pushed.

Figure 9:
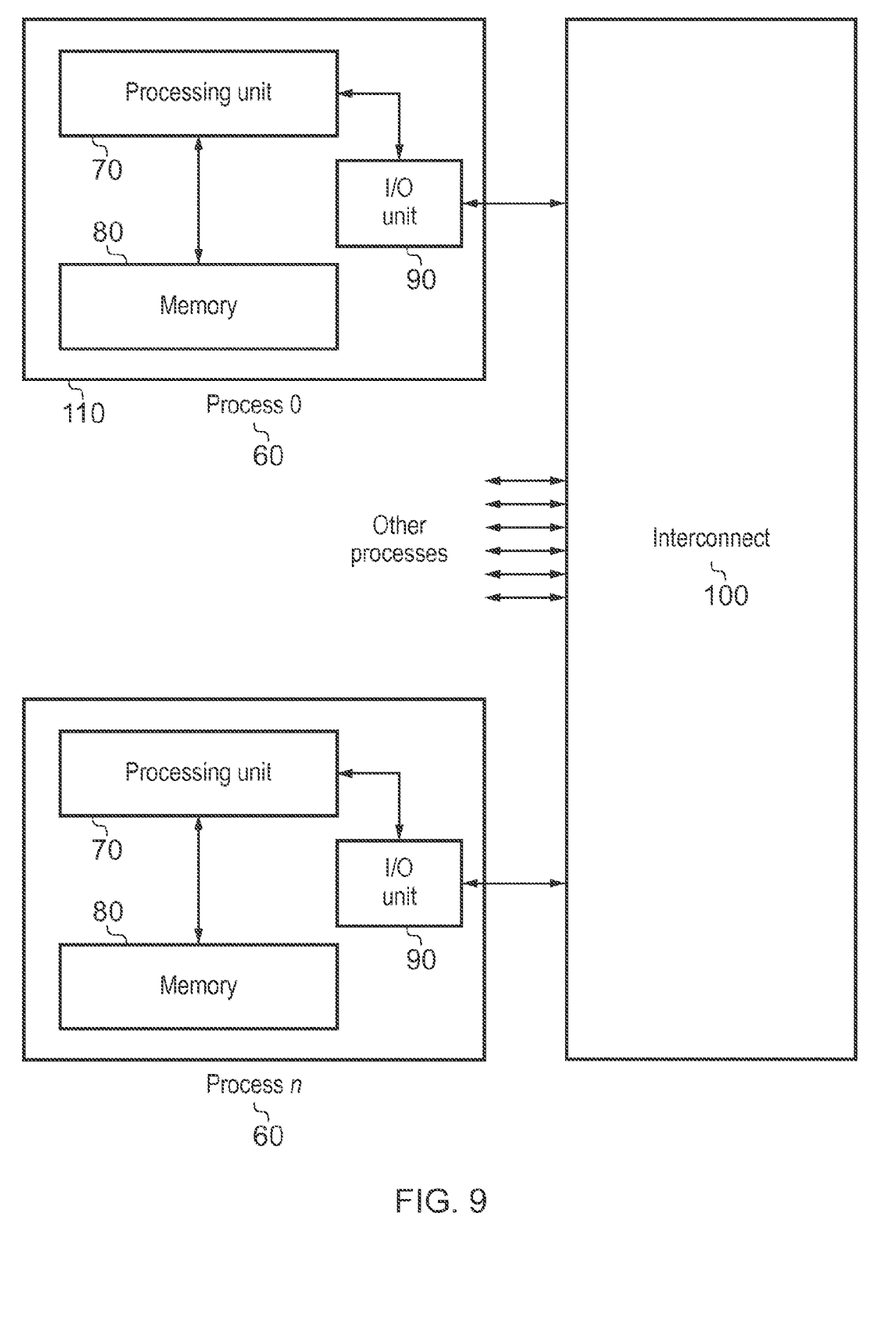
FIG. 9 is a hardware diagram illustrating the structure of a computing system according to the invention.

FIG. 9 shows a schematic diagram illustrating n+1 processes, of which only two processes (60), referred to specifically as Process 0 and Process n are shown. The hardware resources which the processes execute on is part of a computer system 50 (not shown). Each process uses individual resources including a single processing unit or element (70) and memory (80). The processing unit (70) is connected to an input/output unit (90) and the processes can be interconnected using interconnect (100). If process 0 belongs to a fast solver, and process n is a corresponding process of an accurate solver, then a value stored in memory for process 0 can be copied to memory for process n via interconnect 100, in the event that there is a fault in the accurate solver.

Embodiments of the invention can provide:

An algorithm to ensure that an application will run to completion and return a result, even in the presence of faults (assuming that the number of faults is small relative to the number of CPUs)—see FIG. 3 for an overview of how the path through execution of the application guarantees this.

The computation of multiple versions of the solution at different levels of accuracy, with the less accurate solutions requiring very much less CPU time.

The use of values from the less accurate versions of the solution to replace missing values that are lost from the more accurate version of the solution in the event of a fault.

Re-initialization of the less accurate versions of the solution using the latest values of the more accurate versions to ensure that the fall-back solutions do not diverge too far from the most accurate solution.

It may not be necessary for the less accurate solvers to be numerically stable in order for the overall accuracy of the fault-tolerant method to be acceptable.

The method of invention embodiments can have the following benefits over the existing state-of-the-art:

No reliance on an underlying MPI implementation to handle faults (other than the requirement that application execution is not automatically terminated by the MPI on detection of a fault).

There is no need for processes to wait while computation on a faulty node since the last checkpoint is recomputed (or while the work is reassigned amongst a task pool)—the fast solution is computed at the same time as the accurate solution.

There is little cost in overall execution time from computing the fast solution as only a very small number of processes are required to do this (c.f. standard replication of work in which 50% of available resources must be used for the replicated work).

There are no underlying assumptions made about the nature of the application (e.g. grid-based)—any application for which it is possible to make a trade-off between accuracy and compute time is tractable to this solution.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of improving fault tolerance in a computing system arranged to find a computational solution, the method comprising:
computing at least two versions of the solution by using a hierarchy of at least two different solvers in parallel; and
if there is a fault during execution of a first solver resulting in a missing value, substituting a value from a second solver that is lower in the hierarchy to replace the missing value.

2. A method according to claim 1, wherein two different solvers are a less accurate solver and a more accurate solver and
if there is a fault during execution of the more accurate solver resulting in a missing value, a value from the less accurate solver is substituted to replace the missing value in the more accurate solver.

3. A method according to claim 2, wherein each solver executes in a number of processes hosted on the computing system, the less accurate solver being split into fewer processes, and wherein the less accurate solver processes account for less than less than 1% of the total number of processes for both solvers.

4. A method according to claim 2, wherein the less accurate solver uses a computationally less intensive approximation than the more accurate solver to compute the solution.

5. A method according to claim 2, wherein a more accurate solver methodology includes periodic synchronization of values across a computation, and the less accurate solver is periodically refreshed with a most recently synchronized values from the more accurate solver.

6. A method according to claim 1, wherein the computing system comprises multiple processing units, and preferably wherein the less accurate solver executes on fewer processing units than the more accurate solver.

7. A method according to claim 1, wherein value substitution is managed by a controlling application to provide a current value from the solver that is lower in the hierarchy to substitute into the computation in the solver from which the value is missing.

8. A method according to claim 1, wherein the computing system is a multiple CPU system and a high performance computing HPC system.

9. A method according to claim 1, wherein three or more different versions of the solution are computed using a hierarchy of three or more solvers of different accuracy levels, the method comprising:
computing the three or more versions of the solution by using all the solvers in parallel; and
during execution of the solvers, substituting a value from a less accurate solver to replace a missing value in a more accurate solver one level in the hierarchy above the less accurate solver in the hierarchy.

10. A method according to claim 1, further comprising, during execution of the solvers, substituting a value one of from the solver that is higher in the hierarchy and from a duplicate solver for the solver that is lower in the hierarchy to replace a missing value in the solver that is lower in the hierarchy resulting from a fault in the execution of that solver.

11. A method according to claim 1, wherein the solver that is lower in the hierarchy uses a numerically unstable method.

12. A method according to claim 1, wherein the missing value is one of due to miscommunication between processing units of the computing system and due to a failed computation at a processing unit of the computing system.

13. A method according to claim 1, further comprising detection of a fault is one of by receipt of a notification from a message passing interface and by detection within the solver itself.

14. A computing system comprising a plurality of processing units linked by an interconnect and configured to find at least two versions of a computational solution in parallel using a hierarchy of at least two different solvers:
a smaller subset of the processing units being arranged to compute one version of the solution using a solver that is lower in the hierarchy and a larger subset of the processing units being arranged to compute other version of the solution using a solver that is higher in the hierarchy;
wherein if there is a fault during execution of the solver that is higher in the hierarchy resulting in a missing value, the interconnect is arranged to, during execution of the solvers, substitute a value from the solver that is lower in the hierarchy to replace the missing value.

15. A non-transitory computer-readable storage medium tangibly embodying a computer program, which when executed on a computing system, carries out a method comprising:
computing at least two versions of a computational solution using a hierarchy of different solvers in parallel;
if there is a fault during execution of a solver resulting in a missing value, substituting a value from a solver that is lower in the hierarchy to replace the missing value; and
using the solution of the solver that is higher in the hierarchy as the computational solution.

* * * * *